United States Patent
Okamoto (10) Patent No.: US 12,230,292 B2
(45) Date of Patent: Feb. 18, 2025

(54) HARD DISK DEVICE

(71) Applicants: Kabushiki Kaisha Toshiba, Tokyo (JP); Toshiba Electronic Devices & Storage Corporation, Tokyo (JP)

(72) Inventor: Makoto Okamoto, Kodaira Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 226 days.

(21) Appl. No.: 17/939,724

(22) Filed: Sep. 7, 2022

(65) Prior Publication Data

US 2023/0298624 A1 Sep. 21, 2023

(30) Foreign Application Priority Data

Mar. 18, 2022 (JP) ................. 2022-044186

(51) Int. Cl.
*G11B 17/02* (2006.01)
(52) U.S. Cl.
CPC .................. *G11B 17/02* (2013.01)
(58) Field of Classification Search
None
See application file for complete search history.

(56) References Cited

U.S. PATENT DOCUMENTS

| | | | |
|---|---|---|---|
| 5,847,896 A | 12/1998 | Stefansky | |
| 6,288,866 B1* | 9/2001 | Butler | G11B 33/08 |
| 6,490,123 B1 | 12/2002 | Okunaga et al. | |
| 6,900,962 B1 | 5/2005 | Forbord | |
| 6,961,202 B2* | 11/2005 | Ikedo | G11B 33/121 |
| | | | 360/99.18 |
| 7,256,960 B2* | 8/2007 | Cho | G11B 33/08 |
| 11,488,637 B2* | 11/2022 | Akatsuka | G11B 33/14 |
| 11,574,653 B2* | 2/2023 | Uehara | G11B 5/54 |
| 11,594,246 B2* | 2/2023 | Tukada | G11B 5/012 |
| 11,594,248 B1* | 2/2023 | Tukada | G11B 5/4826 |
| 11,749,308 B2* | 9/2023 | Kato | G11B 33/022 |
| | | | 360/240 |
| 2003/0165033 A1* | 9/2003 | Sasaki | G11B 5/5569 |
| 2006/0066993 A1* | 3/2006 | Agematsu | G11B 33/08 |
| 2006/0132966 A1* | 6/2006 | Serizawa | G11B 19/2009 |
| | | | 360/99.15 |
| 2006/0212883 A1* | 9/2006 | Yang | G11B 17/051 |
| | | | 720/619 |
| 2006/0232878 A1* | 10/2006 | Saruta | H05K 1/182 |
| | | | 360/99.15 |

(Continued)

*Primary Examiner* — Fred Tzeng
(74) *Attorney, Agent, or Firm* — Maier & Maier, PLLC (57) ABSTRACT

According to one embodiment, a disk device includes magnetic disks, a spindle motor, and a housing. The magnetic disks are arranged in an axial direction. The spindle motor rotates the magnetic disks about a first rotation axis extending in the axial direction. The housing includes a first wall, an inner surface of the first wall, an outer surface of the first wall, and a second wall. The spindle motor is attached to the first wall. The first wall is apart from the magnetic disks in the axial direction. The second wall protrudes from the first wall and surrounds the plurality of magnetic disks in a direction orthogonal to the axial direction. In the axial direction a maximum distance between the inner surface and the outer surface is 1.5% or more and 8% or less of a maximum dimension of the housing.

19 Claims, 7 Drawing Sheets

(56) References Cited

U.S. PATENT DOCUMENTS

| | | | | |
|---|---|---|---|---|
| 2008/0165448 | A1* | 7/2008 | Ichikawa | G11B 25/043 29/603.03 |
| 2010/0321821 | A1* | 12/2010 | Iwase | G11B 33/1486 360/97.16 |
| 2017/0168527 | A1* | 6/2017 | Eguchi | G06F 1/187 |
| 2023/0036546 | A1* | 2/2023 | Akatsuka | G11B 33/12 |
| 2023/0088522 | A1* | 3/2023 | Kato | G11B 25/043 360/240 |

* cited by examiner

HARD DISK DEVICE

CROSS-REFERENCE TO RELATED APPLICATIONS

This application is based upon and claims the benefit of priority from Japanese Patent Application No. 2022-044186, filed on Mar. 18, 2022, the entire contents of which are incorporated herein by reference.

FIELD

Embodiments described herein relate generally to a disk device.

BACKGROUND

A disk device such as a hard disk drive includes a plurality of magnetic disks. In general, the disk device incorporating a larger number of magnetic disks has a larger storage capacity.

A plurality of disk devices may be prepared in order to obtain a desired storage capacity. In this case, the larger the storage capacity per volume the disk devices have, the smaller the number of disk devices to be prepared is.

DETAILED DESCRIPTION

In general, according to one embodiment, a disk device includes a plurality of magnetic disks, a spindle motor, and a housing for accommodating the plurality of magnetic disks. Each of the plurality of magnetic disks has a recording surface. The magnetic disks are arranged at intervals in an axial direction intersecting the recording surface. The spindle motor is configured to hold the plurality of magnetic disks and rotate the plurality of magnetic disks about a first rotation axis extending in the axial direction. The housing includes a first wall, an inner surface of the first wall, an outer surface of the first wall, and a second wall. The spindle motor is attached to the first wall. The first wall is apart from the plurality of magnetic disks in the axial direction. The inner surface faces the recording surface. The outer surface is opposite the inner surface. The second wall protrudes from the first wall and surrounds the plurality of magnetic disks in a direction orthogonal to the axial direction. In the axial direction a maximum distance between the inner surface and the outer surface is 1.5% or more and 8% or less of a maximum dimension of the housing.

First Embodiment

Hereinafter, a first embodiment will be described with reference to FIGS. 1 to 5. Note that, in the present specification, components according to embodiments and descriptions of the components may be described in a plurality of expressions. The components and the description thereof are examples, and are not limited by the expression of the present specification. Components may also be identified with names different from those herein. In addition, the component may be described by an expression different from the expression in the present specification.

Figure 1:
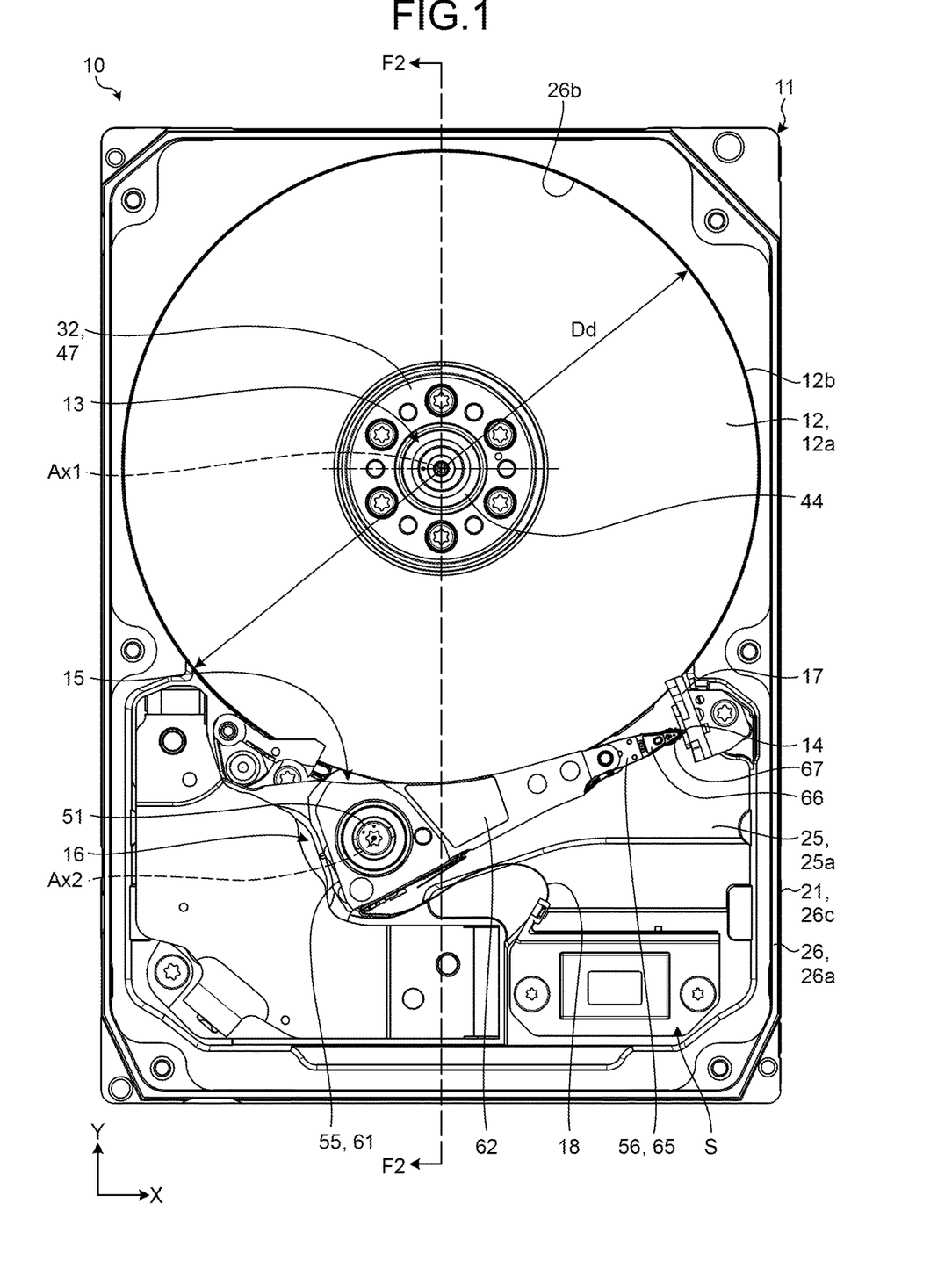
FIG. 1 is an exemplary plan view illustrating a hard disk drive (HDD) according to a first embodiment.

FIG. 1 is an exemplary plan view illustrating a hard disk drive (HDD) 10 according to a first embodiment. The HDD 10 is an example of a disk device, and may also be referred to as an electronic device, a storage device, an external storage device, or a magnetic disk device.

As illustrated in the drawings, in the present specification, an X axis, a Y axis, and a Z axis are defined for convenience. The X axis, the Y axis, and the Z axis are orthogonal to each other. The X axis is provided along a width of the HDD 10. The Y axis is provided along a length of the HDD 10. The Z axis is provided along a thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis, and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

Figure 2:
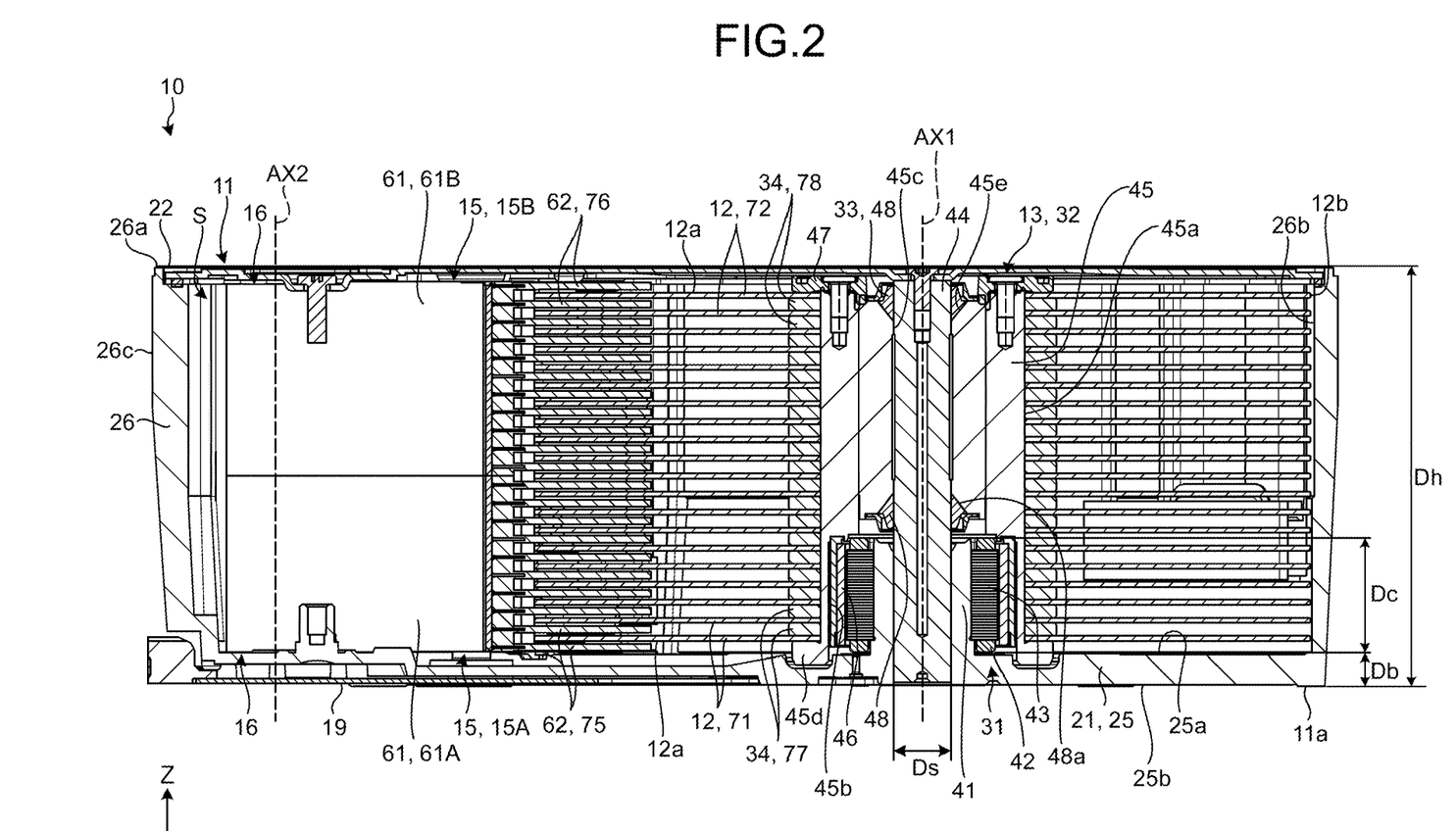
FIG. 2 is an exemplary cross-sectional view illustrating the HDD of the first embodiment along line F2-F2 of FIG. 1.

FIG. 2 is an exemplary cross-sectional view of the HDD 10 according to the first embodiment taken along line F2-F2 in FIG. 1. The HDD 10 includes a housing 11, a plurality of magnetic disks 12, a spindle motor 13, a plurality of magnetic heads 14, a plurality of actuator assemblies 15, a plurality of voice coil motors (VCM) 16, a plurality of ramp load mechanisms 17, and a flexible printed circuit board (FPC) 18 illustrated in FIG. 1, and a printed circuit board (PCB) 19 illustrated in FIG. 2. The magnetic disk 12 may also be referred to as a platter or a medium. The magnetic head 14 may also be referred to as a slider. The ramp load mechanism 17 is an example of a ramp.

The housing 11 has an inner chamber S. The housing 11 accommodates the magnetic disks 12, the spindle motor 13, the magnetic heads 14, the actuator assemblies 15, the VCM 16, the ramp load mechanism 17, and the FPC 18 in the inner chamber S.

As illustrated in FIG. 2, the housing 11 includes a base 21 and a cover 22. Note that the housing 11 is not limited to this example. In addition, FIG. 1 illustrates the housing 11 with the cover 22 omitted for the sake of description.

The base 21 is made of a metal material such as an aluminum alloy, for example, and has a substantially rectangular parallelepiped box shape opened in the +Z direction. The base 21 has a bottom wall 25 and a side wall 26. The bottom wall 25 is an example of a first wall. The side wall 26 is an example of a second wall.

The bottom wall 25 has a substantially rectangular (quadrangular) plate shape extending along an X-Y plane. The side wall 26 protrudes substantially in the +Z direction from an edge of the bottom wall 25 and has a substantially rectangular frame shape. The bottom wall 25 and the side wall 26 are integrally formed. The bottom wall 25 has an inner surface 25a and an outer surface 25b.

The inner surface 25a of the bottom wall 25 is an inner surface of the base 21. The inner surface 25a faces substantially in the +Z direction as a whole. The inner surface 25a is provided with, for example, irregularities, and the irregularities may face in a direction different from the +Z direction.

The outer surface 25b is an outer surface of the base 21. That is, the outer surface 25b is exposed to the outside of the housing 11. The outer surface 25b is opposite the inner surface 25a. The outer surface 25b faces substantially the −Z direction as a whole. The outer surface 25b may be provided with, for example, irregularities, and the irregularities may face in a direction different from the −Z direction.

An end 11a of the housing 11 in the −Z direction is included in the outer surface 25b. The end 11a is an example of the first end. The end 11a is also an end of the HDD 10 in the −Z direction. Note that the end 11a is not limited to this example.

The side wall 26 has an end surface 26a. The end surface 26a is an example of a second end. The end surface 26a is at an end of the side wall 26 in the +Z direction. The end surface 26a is opposite the outer surface 25b (end 11a) of the bottom wall 25 in the base 21. The end surface 26a is substantially flat and faces substantially in the +Z direction.

The cover 22 is made of, for example, a metal material such as an aluminum alloy. The cover 22 is fixed to the end surface 26a of the side wall 26 by welding, for example. The cover 22 may include, for example, an inner cover fixed to the side wall 26 with a screw, and an outer cover that covers the inner cover and is fixed to the end surface 26a by welding.

The inner chamber S is formed, defined, or partitioned by, for example, the bottom wall 25, the side wall 26, and the cover 22. The inner chamber S is hermetically sealed. Note that slight gas movement may be possible between the inner chamber S and the outside of the housing 11.

The inner chamber S is filled with a gas different from air. For example, the inner chamber S is filled with a low density gas having a density lower than that of air, an inert gas having low reactivity, or the like. In the present embodiment, the inner chamber S is filled with helium. The inner chamber S may be filled with another fluid.

The plurality of magnetic disks 12 expands along the X-Y plane. In the present embodiment, each of the magnetic disks 12 has a diameter Dd of, for example, about 3.5 inches, specifically, 80 mm or more and 100 mm or less. Note that the diameter Dd of the magnetic disk 12 is not limited to this example. Each of the magnetic disks 12 has at least one recording surface 12a and an outer edge 12b.

The magnetic disk 12 has the recording surface 12a on at least one of the upper surface and the lower surface. In other words, each recording surface 12a is the surface of the magnetic disk 12 facing substantially the +Z direction or substantially the −Z direction.

The recording surface 12a is a substantially flat surface extending along the X-Y plane. A magnetic recording layer of the magnetic disk 12 is provided on the recording surface 12a. Note that the magnetic recording layer may not be provided on a part of the recording surface 12a. The outer edge 12b is an outer peripheral surface of the magnetic disk 12.

The plurality of magnetic disks 12 is arranged at intervals in the Z direction. The Z direction is a direction intersecting the recording surface 12a, and is an example of an axial direction. The recording surface 12a facing in the +Z direction of one of the two adjacent magnetic disks 12 and the recording surface 12a facing in the −Z direction of the other of the two magnetic disks 12 face each other with an interval therebetween.

The number of the magnetic disks 12 is, for example, 20 or more. In the example of FIG. 2, the HDD 10 includes 20 magnetic disks 12. Note that the number of the magnetic disks 12 is not limited to this example.

The plurality of magnetic disks 12 is located between the cover 22 and the bottom wall 25 in the Z direction. The cover 22 and the bottom wall 25 are separated from the plurality of magnetic disks 12 in the Z direction. The recording surfaces 12a of the plurality of magnetic disks 12 facing in the −Z direction and the inner surface 25a of the bottom wall 25 face each other with an interval.

The side wall 26 surrounds the plurality of magnetic disks 12 in the direction orthogonal to the Z direction. The side wall 26 is spaced apart from the plurality of magnetic disks 12. The side wall 26 has a shroud 26b. The shroud 26b is a substantially cylindrical curved surface extending along the outer edge 12b of the magnetic disk 12, and faces the outer edge 12b with a substantially constant gap.

The spindle motor 13 holds the plurality of magnetic disks 12. The spindle motor 13 rotates the plurality of magnetic disks 12 about a first rotation axis Ax1. The first rotation axis Ax1 is a virtual axis extending in the Z direction (+Z direction and −Z direction).

In the present specification, an axial direction, a radial direction, and a circumferential direction are defined. The axial direction is a direction along the first rotation axis Ax1, and includes one direction and the other direction along the first rotation axis Ax1. The axial direction is equal to the Z direction. The radial direction is a direction orthogonal to the first rotation axis Ax1, and includes a plurality of directions orthogonal to the first rotation axis Ax1. The circumferential direction is a direction of rotation around the first rotation axis Ax1, and includes a direction of clockwise rotation and a direction of counterclockwise rotation around the first rotation axis Ax1.

The first rotation axis Ax1 is the center of rotation by the spindle motor 13, and is also the axis of the magnetic disk 12 and the spindle motor 13. Note that the axis of the magnetic disk 12 and the axis of the spindle motor 13 may be different from the center of rotation by the spindle motor 13. The spindle motor 13 includes a stator 31, a rotor 32, a bearing 33, and a plurality of spacers 34.

The stator 31 is attached to the bottom wall 25. The stator 31 includes, for example, a sleeve 41, a plurality of coils 42, a plurality of cores 43, and a shaft 44. Note that the stator 31 is not limited to this example.

The sleeve 41 has a substantially cylindrical shape that surrounds the first rotation axis Ax1 and extends in the Z direction. The sleeve 41 protrudes in the +Z direction from the inner surface 25a of the bottom wall 25. The sleeve 41 may be a component different from the bottom wall 25.

The plurality of coils 42 is wound around the corresponding cores 43. The coil 42 and the core 43 form a magnetic pole. The coils 42 and the cores 43 are located outside the sleeve 41 in the radial direction and are arranged at substantially equal intervals in the circumferential direction. In other words, the coils 42 surround the first rotation axis Ax1.

The shaft 44 has a substantially circular column shape extending in the Z direction along the first rotation axis Ax1.

The shaft 44 is fitted into the sleeve 41 and attached to the housing 11. In the present embodiment, a diameter Ds of the shaft 44 is set to 5 mm or more and 10 mm or less. The diameter Ds of the shaft 44 is not limited to this example.

The rotor 32 rotates about the first rotation axis Ax1 with respect to the housing 11 and the stator 31. The rotor 32 includes a hub 45, a magnet 46, and a clamp 47. Note that the rotor 32 is not limited to this example.

The hub 45 has a substantially cylindrical shape that surrounds the first rotation axis Ax1 and extends in the Z direction. The hub 45 has an outer surface 45a, a first inner surface 45b, a second inner surface 45c, and a flange 45d.

The outer surface 45a has a substantially cylindrical shape facing outward in the radial direction. The first inner surface 45b and the second inner surface 45c are opposite the outer surface 45a, and have a substantially cylindrical shape facing inward in the radial direction. The first inner surface 45b surrounds the plurality of coils 42 and the plurality of cores 43. The second inner surface 45c is more apart from the bottom wall 25 than the first inner surface 45b. The second inner surface 45c faces the shaft 44. The flange 45d protrudes radially outward from an end of the outer surface 45a in the −Z direction.

The magnet 46 is provided on the first inner surface 45b together with a yoke. The magnet 46 is located outside the plurality of coils 42 and the plurality of cores 43 in the radial direction. The magnetic pole formed by the plurality of coils 42 and the plurality of cores 43 faces the magnetic pole of the magnet 46.

The clamp 47 is attached to an end of the hub 45 in the +Z direction. Therefore, the flange 45d and the clamp 47 are separated from each other in the Z direction. A part of the clamp 47 protrudes radially outward from the outer surface 45a of the hub 45. The clamp 47 is biased toward the flange 45d by, for example, a spring.

The bearing 33 is, for example, a fluid bearing. The bearing 33 includes, for example, two support members 48. The two support members 48 are attached to the shaft 44 at positions separated from each other in the Z direction, for example.

Each of the two support members 48 has, for example, a substantially conical support surface 48a. The support surface 48a faces a support surface 45e provided on the hub 45. The support surface 45e of the hub 45 is a substantially conical curved surface corresponding to the support surface 48a of the support member 48.

The gap between the support surface 45e of the hub 45 and the support surface 48a of the support member 48 is filled with a lubricating oil. Thus, the bearing 33 rotatably supports the rotor 32 around the first rotation axis Ax1 via the lubricating oil. The support surface 45e is provided with a groove where a dynamic pressure is generated. The bearing 33 is not limited to this example.

In the Z direction, the bearing 33 extends between the cover 22 and the coil 42. The bearing 33 and the coil 42 are juxtaposed to each other in the axial direction. The bearing 33 and the coil 42 may be juxtaposed to each other in the radial direction, for example.

Each of the spacers 34 is disposed between two adjacent magnetic disks 12 among the plurality of magnetic disks 12. In other words, the plurality of magnetic disks 12 and the plurality of spacers 34 are alternately arranged in the Z direction. Therefore, the plurality of spacers 34 maintains the interval between the plurality of magnetic disks 12.

The outer surface 45a of the hub 45 is disposed inside the plurality of magnetic disks 12 and the plurality of spacers 34, and faces the plurality of magnetic disks 12 and the plurality of spacers 34. The rotor 32 holds the plurality of magnetic disks 12 and the plurality of spacers 34 between the flange 45d of the hub 45 and the clamp 47.

The plurality of magnetic heads 14 illustrated in FIG. 1 records and reproduces information on and from the corresponding recording surfaces 12a of the plurality of magnetic disks 12. In other words, each magnetic head 14 reads and writes information from and to the recording surface 12a of the magnetic disk 12. The magnetic heads 14 are mounted on the corresponding actuator assemblies 15.

The plurality of actuator assemblies 15 is rotatably supported by a support shaft 51 disposed at a position spaced apart from the magnetic disk 12. The support shaft 51 extends, for example, in the substantially +Z direction from the inner surface 25a of the bottom wall 25. The plurality of actuator assemblies 15 is arranged in the Z direction.

The plurality of actuator assemblies 15 may be individually referred to as actuator assemblies 15A and 15B. The actuator assembly 15A is closer to the bottom wall 25 than the actuator assembly 15B. The actuator assembly 15B is closer to the cover 22 than the actuator assembly 15A.

The actuator assemblies 15A and 15B may individually rotate about a second rotation axis Ax2 that is radially spaced from the first rotation axis Ax1. That is, the HDD 10 includes a so-called multi-actuator. The HDD 10 may include a single actuator assembly 15.

The second rotation axis Ax2 is a virtual axis extending substantially in the Z direction (+Z direction and −Z direction). Therefore, the first rotation axis Ax1 and the second rotation axis Ax2 are arranged substantially in parallel. The second rotation axis Ax2 is, for example, the center of rotation of the actuator assembly 15 and is also the axis of the support shaft 51.

Each of the plurality of VCMs 16 rotates a corresponding one of the plurality of actuator assemblies 15A and 15B around the second rotation axis Ax2, and the one actuator assembly is disposed at a desired position. Each of the plurality of VCMs 16 can rotate the plurality of actuator assemblies 15A and 15B at different angular velocities and in different directions.

Figure 3:
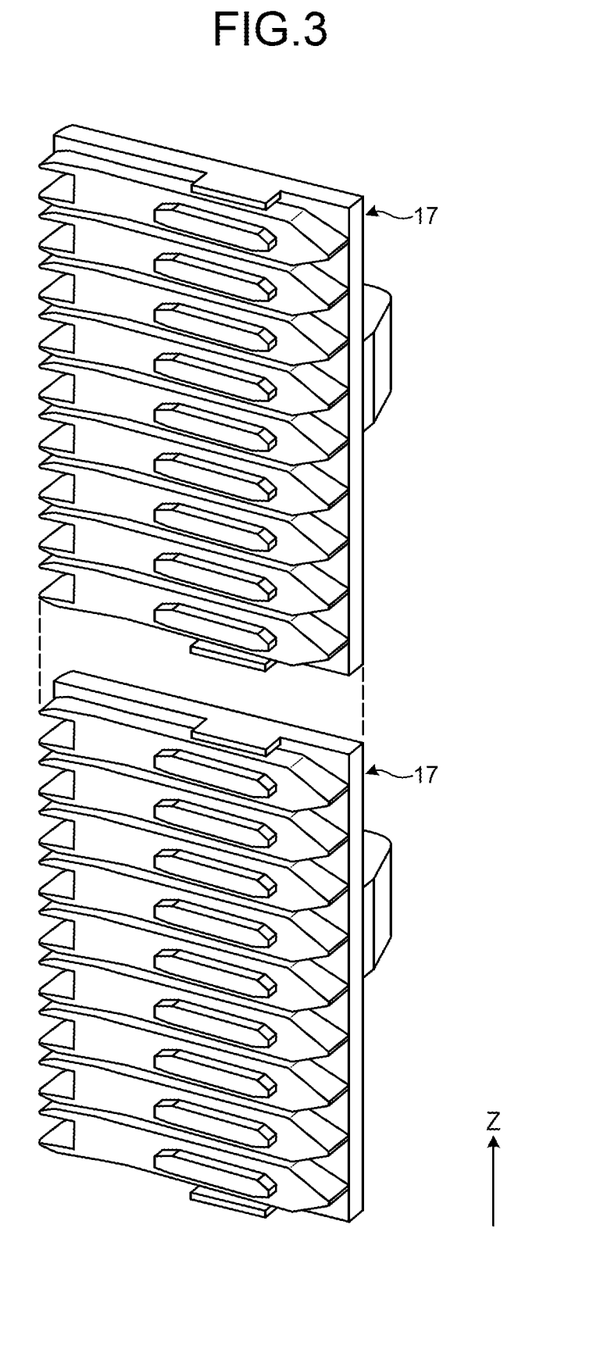
FIG. 3 is an exemplary perspective view illustrating a ramp load mechanism of the first embodiment.

FIG. 3 is an exemplary perspective view illustrating the ramp load mechanisms 17 of the first embodiment. The ramp load mechanisms 17 are made of, for example, synthetic resin and aligned with each other in the Z direction. In the present embodiment, the number of the actuator assemblies 15, the number of the VCMs 16, and the number of the ramp load mechanisms 17 are all the same, but the numbers thereof are not limited to this example.

The plurality of ramp load mechanisms 17 is disposed apart from the first rotation axis Ax1 in the radial direction. The actuator assembly 15 is rotated by the VCM 16 to move the corresponding magnetic head 14. Having reached the outermost periphery of the magnetic disk 12, the magnetic head 14 is held by the corresponding ramp load mechanisms 17 apart from the magnetic disk 12.

Each of the actuator assemblies 15A and 15B illustrated in FIG. 1 includes a carriage 55 and a plurality of head suspension assemblies (suspensions) 56. That is, the HDD 10 includes a plurality of carriages 55. The suspension 56 may also be referred to as a head gimbal assembly (HGA).

The carriages 55 are made of a metal material such as an aluminum alloy. The material of the carriages 55 is not limited to this example. Each of the carriages 55 includes an actuator block 61 and a plurality of arms 62.

The actuator blocks 61 are rotatably supported by the support shaft 51 via a bearing, for example. Thus, the plurality of carriages 55 can individually rotate about the second rotation axis Ax2.

The actuator block 61 included in the actuator assembly 15A may be referred to as an actuator block 61A. The actuator block 61 included in the actuator assembly 15B may be referred to as an actuator block 61B. The actuator block 61A is located between the bottom wall 25 and the actuator block 61B. The actuator block 61B is located between the cover 22 and the actuator block 61A.

The plurality of arms 62 protrudes from the actuator block 61 in a direction substantially orthogonal to the second rotation axis Ax2. The plurality of arms 62 is arranged at intervals in the Z direction. The arms 62 has a plate shape to enter between the adjacent magnetic disks 12. The plurality of arms 62 extends substantially in parallel.

The voice coil of the corresponding VCM 16 is provided on the protrusion protruding from the actuator blocks 61A and 61B. The VCM 16 includes a pair of yokes, a voice coil disposed between the yokes, and a magnet provided on the yoke.

The suspensions 56 are attached to the tip ends of the arms 62 of the corresponding carriages 55 and protrude from the arms 62. Accordingly, the suspensions 56 are disposed at intervals in the Z direction. Each of the suspensions 56 includes a base plate 65, a load beam 66, and a flexure 67.

The base plate 65 and the load beam 66 are made of, for example, stainless steel. The base plate 65 and the load beam 66 may be made of other materials or may be made of materials different from each other.

The base plate 65 is attached to the tip end of the arm 62. The load beam 66 is attached to the tip end of the base plate 65 and protrudes from the base plate 65 in the direction substantially orthogonal to the second rotation axis Ax2.

The load beam 66 is thinner than the base plate 65 and has a plate shape extending along the X-Y plane. That is, the load beam 66 is supported by the base plate 65 in a cantilever manner, and can be bent with one end attached to the base plate 65 as a fulcrum.

The flexure 67 has an elongated belt shape. Note that the shape of the flexure 67 is not limited to this example. The flexure 67 is, for example, a multilayer plate including a metal plate (backing layer) made of stainless steel or the like, an insulating layer formed on the metal plate, a conductive layer formed on the insulating layer and having a plurality of wires (wiring patterns), and a protective layer (insulating layer) covering the conductive layer.

The flexure 67 is attached to the base plate 65 and the load beam 66. The flexure 67 includes a displaceable gimbal (elastic support) at one end and above the load beam 66. The magnetic head 14 is held by the gimbal. The other end of the flexure 67 is connected to the FPC 18. As a result, the FPC 18 is electrically connected to the magnetic head 14 via the wiring of the flexure 67.

One end of the FPC 18 is connected to the flexure 67 as described above. The other end of the FPC 18 is electrically connected to the PCB 19 via, for example, a connector provided on the bottom wall 25.

The PCB 19 illustrated in FIG. 2 is located outside the housing 11 and attached to the bottom wall 25. For example, a controller that controls the entire HDD 10 and an interface connector connected to a host computer are mounted on the PCB 19. The PCB 19 is electrically connected to the magnetic head 14 via the FPC 18 and the flexure 67.

In the present embodiment, the maximum thickness Db of the bottom wall 25 is set to 1.5% or more and 8% or less of the maximum thickness Dh of the housing 11. The maximum thickness Db of the bottom wall 25 corresponds to a maximum distance between the inner surface 25a and the outer surface 25b of the bottom wall 25 in the Z direction. The maximum thickness Dh of the housing 11 is the maximum dimension of the housing 11 in the Z direction. In the present embodiment, the maximum thickness Dh of the housing 11 is equal to the maximum dimension of the HDD 10 in the Z direction.

The maximum thickness Dh of the housing 11 is set to 26.2 mm or more. Form factor SFF-8300 of the 3.5-inch hard disk drive, as formulated by the Small Form Factor Committee, defines a plurality of maximum dimensions (hereinafter, referred to as specified dimensions) for the dimension of the HDD in the Z direction. One of the specified dimensions defined by the SFF-8300 is 26.10 mm. Thus, the maximum thickness Dh of the housing 11 in the present embodiment is larger than the specified dimension.

More specifically, the maximum thickness Dh of the housing 11 of the present embodiment is set larger than 42 mm and equal to 54 mm or less. Another one of the specified dimensions defined in the SFF-8300 is 42.00 mm. That is, the maximum thickness Dh of the housing 11 in the present embodiment is larger than the specified dimension.

For example, the maximum thickness Db of the bottom wall 25 is set to about 3.5 mm. Meanwhile, the maximum thickness Dh of the housing 11 is set to about 54 mm. The thickness Db is about 6.5% of the thickness Dh. The thicknesses Db and Dh are not limited to this example.

In the present embodiment, the dimension Dc of the coil 42 in the Z direction is set to ⅓ or less of the maximum thickness Dh of the housing 11. For example, the dimension Dc of the coil 42 is set to about 14 mm. Therefore, the dimension Dc is about 26% of the thickness Dh. The dimension Dc of the coil 42 is longer than the sum of the dimensions (thicknesses) of the five magnetic disks 12 and the dimensions (thicknesses) of the four spacers 34 in the Z direction.

The coil 42 having the Z-directional dimension Dc set as above can be compact in size with respect to the housing 11. In addition, the distance between the two support members 48 of the bearing 33 located between the cover 22 and the coil 42 can be set to be relatively long, and the bearing 33 can stably support the rotor 32. The thickness of the bottom wall 25 can also be set to be relatively large (thick), and the bottom wall 25 and the sleeve 41 can stably support the shaft 44. The dimension Dc is not limited to the above example.

Figure 4:
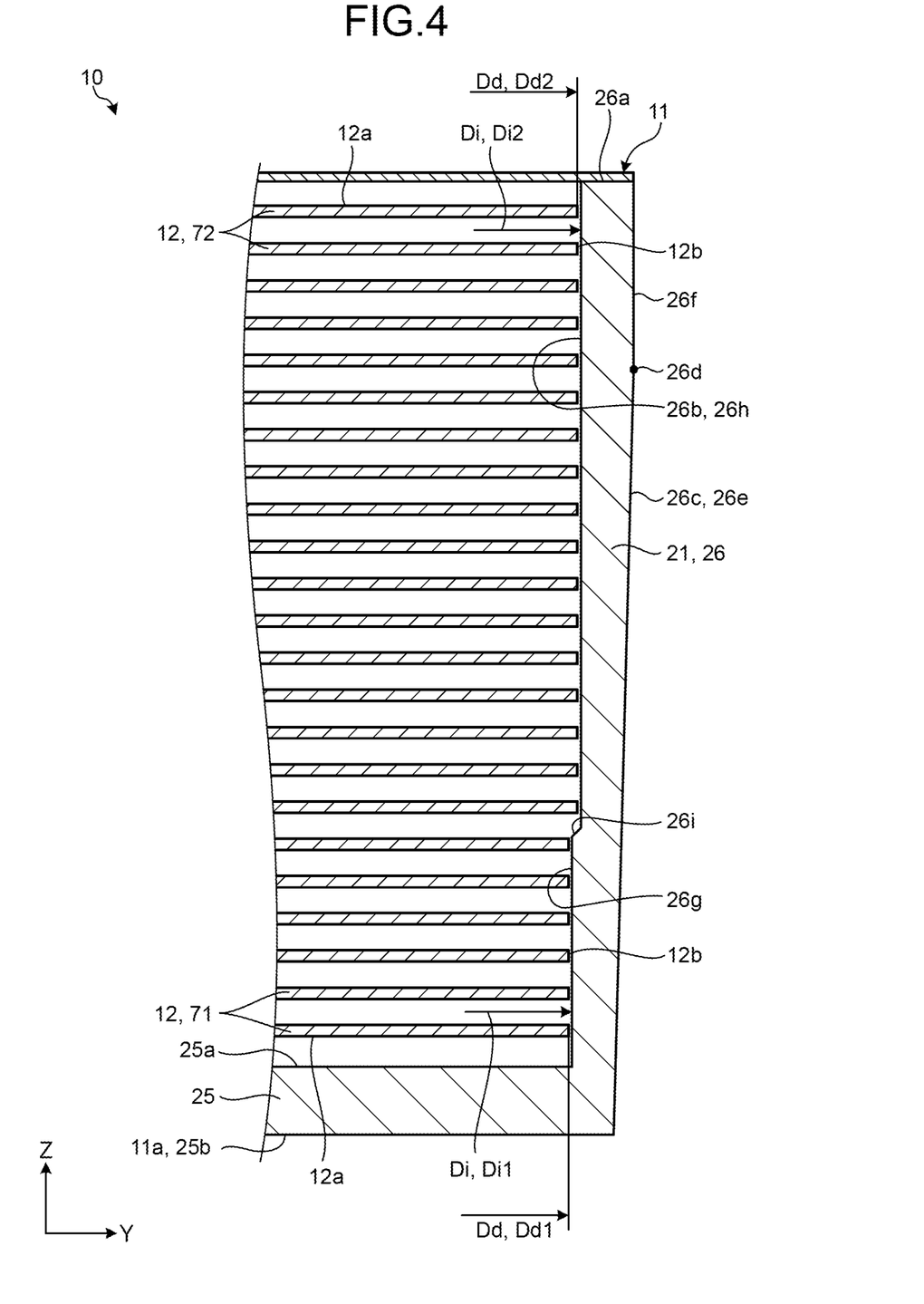
FIG. 4 is an exemplary cross-sectional view schematically illustrating a part of the HDD according to the first embodiment.

FIG. 4 is an exemplary cross-sectional view schematically illustrating a part of the HDD 10 according to the first embodiment. As illustrated in FIG. 4, the plurality of magnetic disks 12 of the present embodiment includes a plurality of first magnetic disks 71 and a plurality of second magnetic disks 72.

The plurality of first magnetic disks 71 is two or more of the plurality of magnetic disks 12. The plurality of second magnetic disks 72 is another two or more of the plurality of magnetic disks 12. The first magnetic disks 71 and the second magnetic disks 72 are identical to each other except for position and diameter.

The plurality of second magnetic disks 72 is more apart from the bottom wall 25 than the plurality of first magnetic disks 71. Each of the first magnetic disks 71 has a diameter Dd1 shorter than a diameter Dd2 of each of the second magnetic disks 72. For example, the diameter Dd1 is shorter than the diameter Dd2 by 1 mm.

Figure 5:
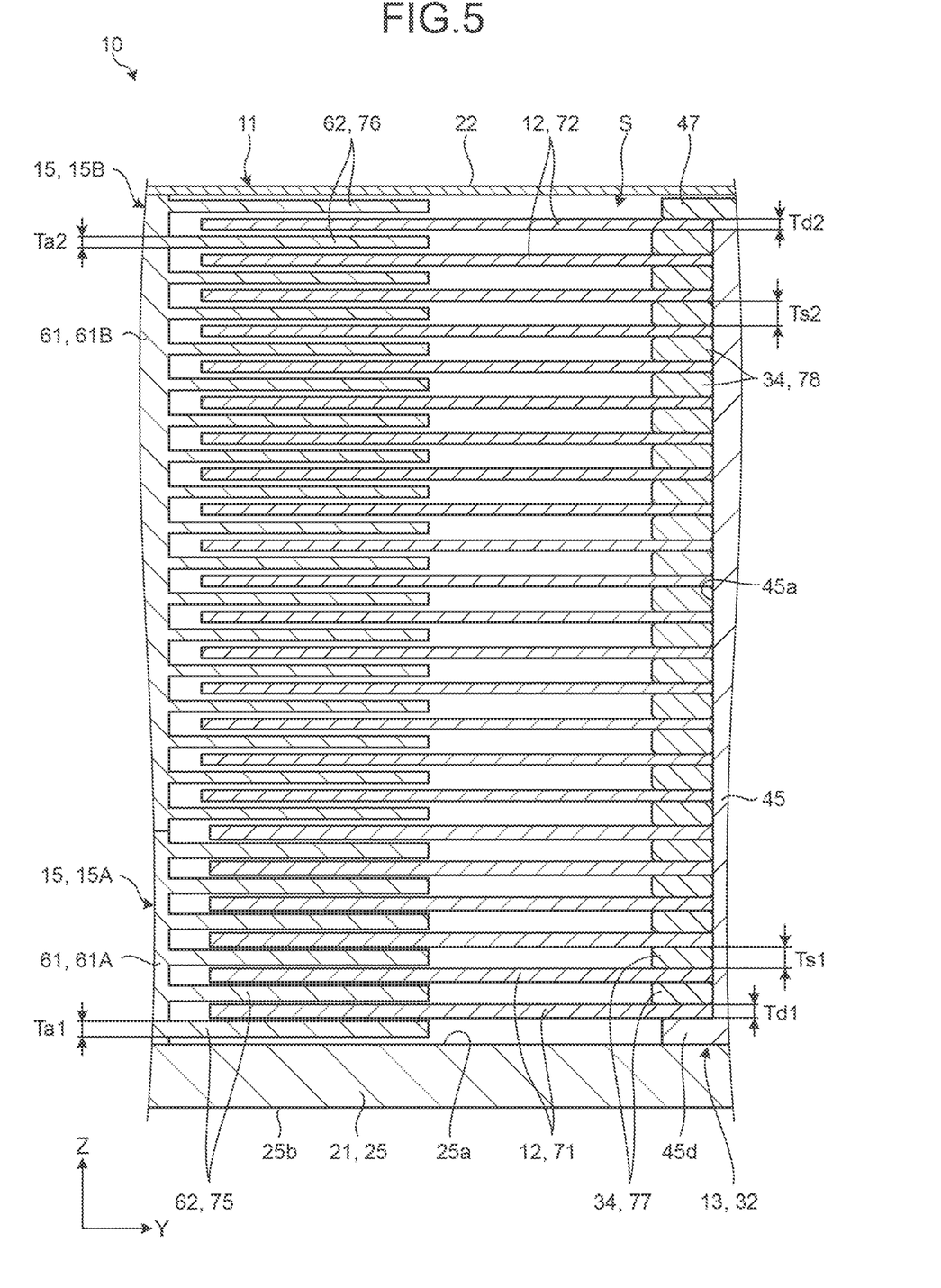
FIG. 5 is an exemplary cross-sectional view schematically illustrating another part of the HDD according to the first embodiment.

FIG. 5 is an exemplary cross-sectional view schematically illustrating another part of the HDD 10 according to the first embodiment. As illustrated in FIG. 5, in the Z direction the plurality of first magnetic disks 71 each has a dimension (thickness) Td1 larger (thicker) than a dimension (thickness) Td2 of each of the second magnetic disks 72. Note that the diameters and thicknesses of the first magnetic disk 71 and the second magnetic disk 72 are not limited to this example.

As illustrated in FIG. 4, the side wall 26 of the housing 11 further has an outer surface 26c and a parting line 26d. The parting line 26d is an example of a boundary line. The outer surface 26c is opposite the shroud 26b and is exposed to the outside of the housing 11. The parting line 26d lies on the outer surface 26c. The parting line 26d is formed, for example, when the base 21 is removed from the mold at the time of manufacturing the base 21. The boundary line is not limited to the parting line 26d formed as described above. The parting line 26d extends in a direction intersecting the Z direction.

The outer surface 26c has a first inclined surface 26e and a flat surface 26f. The first inclined surface 26e is an example of the first surface and the first inclined surface. The first inclined surface 26e and the flat surface 26f are aligned in the Z direction. The parting line 26d is a boundary line between the first inclined surface 26e and the flat surface 26f. In other words, the parting line 26d is a boundary line between the two discontinuous surfaces.

The first inclined surface 26e is provided between the end 11a of the housing 11 and the parting line 26d. The flat surface 26f is provided between the end surface 26a of the side wall 26 and the parting line 26d.

The first inclined surface 26e is inclined with respect to the first rotation axis Ax1 such that it is more apart from the first rotation axis Ax1 as is closer to the parting line 26d. The flat surface 26f extends in the Z direction.

The shroud 26b includes a first shroud 26g, a second shroud 26h, and a step 26i. The first shroud 26g is an example of a first inner surface. The second shroud 26h is an example of a second inner surface. The step 26i is an example of a connection surface.

The first shroud 26g and the second shroud 26h are both substantially cylindrical curved surfaces extending around the first rotation axis Ax1. The first shroud 26g faces the outer edge 12b of the first magnetic disk 71. The second shroud 26h is more apart from the bottom wall 25 than the first shroud 26g. The second shroud 26h faces the outer edge 12b of the second magnetic disk 72.

The diameter Di1 of the first shroud 26g is shorter than the diameter Di2 of the second shroud 26h. The distance between the first shroud 26g and the outer edge 12b of the first magnetic disk 71 is substantially equal to the distance between the second shroud 26h and the outer edge 12b of the second magnetic disk 72.

The step 26i connects between an end of the first shroud 26g in the +Z direction and an end of the second shroud 26h in the −Z direction. The step 26i faces approximately in the +Z direction. In other words, the step 26i faces in a direction intersecting the direction in which the first shroud 26g faces and the direction in which the second shroud 26h faces.

As illustrated in FIG. 5, the plurality of arms 62 includes a plurality of first arms 75 and a plurality of second arms 76. The plurality of first arms 75 is two or more of the plurality of arms 62. The plurality of second arms 76 is another two or more of the plurality of arms 62. The first arms 75 and the second arms 76 are identical to each other except for position and thickness.

The plurality of second arms 76 is more apart from the bottom wall 25 than the plurality of first arms 75. In the Z direction each of the first arms 75 has a larger (thicker) dimension Ta1 (thickness) than a dimension (thickness) Ta2 of each of the second arms 76. Note that the thicknesses of the first arm 75 and the second arm 76 are not limited to this example.

The plurality of spacers 34 includes a plurality of first spacers 77 and a plurality of second spacers 78. The plurality of first spacers 77 is two or more spacers 34 among the plurality of spacers 34. The plurality of second spacers 78 is two or more other spacers 34 among the plurality of spacers 34. The first spacer 77 and the second spacer 78 are equal to each other except for the position and the thickness.

The plurality of second spacers 78 is more apart from the bottom wall 25 than the plurality of first spacers 77. In the Z direction the plurality of first spacers 77 has a dimension (thickness) Ts1 smaller (thinner) than a dimension (thickness) Ts2 of the plurality of second spacers 78 in the Z direction. The thicknesses of the first spacer 77 and the second spacer 78 are not limited to this example.

In a conventional general HDD, the maximum thickness of the HDD in the Z direction is set to 26.10 mm or less in accordance with the SFF-8300. For example, the thickness of the conventional HDD in the Z direction is set to about 1 inch.

For example, two conventional HDDs arranged in the Z direction may be mounted on a device such as a server. In this case, each of the two conventional HDDs has a bottom wall and a cover. That is, there are two bottom walls and two covers. Furthermore, there is a gap between the two conventional HDDs.

Meanwhile, the maximum thickness Dh of the housing 11 of the HDD 10 of the present embodiment in the Z direction is set to about 2 inches. That is, the thickness Dh of the HDD 10 of the present embodiment in the Z direction is set to about twice the thickness of the conventional HDD in the Z direction. Therefore, the HDD 10 of the present embodiment can be accommodated in a space (slot) capable of accommodating two conventional HDDs in the server. In other words, the server can include one HDD 10 of the present embodiment instead of the two conventional HDDs.

The HDD 10 according to the present embodiment includes one bottom wall 25 and one cover 22. In addition, The one HDD 10 is with no gap unlike the two conventional HDDs. Because of this, in the Z direction the size of the inner space (inner chamber S) of the HDD 10 of the present embodiment for accommodating the magnetic disks 12 is larger than the sum of the sizes of the inner spaces of the two conventional HDDs for accommodating the magnetic disks.

As described above, the HDD 10 according to the present embodiment can include more magnetic disks 12 than the two conventional HDDs. For example, it is assumed that each of two conventional HDDs can be mounted with nine magnetic disks. As described above, since the number of the bottom walls 25 and the number of the covers 22 are small and there is no gap, the HDD 10 of the present embodiment can include more than 18 magnetic disks 12. Therefore, a storage capacity of the HDD 10 according to the present embodiment can be larger than a total storage capacity of the two conventional HDDs.

The HDD 10 includes one PCB 19. On the other hand, the two conventional HDDs have two PCBs in total. Therefore, the HDD 10 of the present embodiment can reduce the number of controllers mounted on the PCB 19 per storage capacity, and can reduce power consumption.

In the HDD 10 according to the first embodiment described above, the housing 11 includes the bottom wall 25, the inner surface 25a of the bottom wall 25, the outer surface 25b of the bottom wall 25, and the side wall 26. The spindle motor 13 is attached to the bottom wall 25. The bottom wall 25 is apart from the plurality of magnetic disks 12 in the Z direction. The inner surface 25a faces the recording surfaces 12a of the magnetic disks 12. The outer surface 25b is opposite the inner surface 25a. The side wall 26 protrudes from the bottom wall 25 and surrounds the magnetic disks 12 in a direction orthogonal to the Z direction. In the Z direction the maximum distance (thickness Db) between the inner surface 25a and the outer surface 25b is 1.5% or more and 8% or less of the maximum dimension (thickness Dh) of the housing 11. As a result, due to a decreased ratio of the thickness Db to the thickness Dh, the housing 11 can accommodate a larger number of the magnetic disks 12. As such, the HDD 10 of the present embodiment can provide an increased storage capacity per volume.

The diameter Dd of each of the magnetic disks 12 is set to 80 mm or more and 100 mm or less. Specifically, the magnetic disk 12 has the diameter Dd of about 3.5 inches. The maximum thickness Dh of the housing 11 is set to 26.2 mm or more. That is, the maximum thickness Dh of the housing 11 is larger than 26.10 mm which is one of the maximum dimensions in the Z direction defined by the SFF-8300. As a result, the HDD 10 of the present embodiment can accommodate a larger number of the magnetic disks 12 in the housing 11 without being limited by the maximum Z-directional dimensions defined by the SFF-8300.

The maximum thickness Dh of the housing 11 is set larger than 42 mm and 54 mm or less. Specifically, the maximum thickness Dh of the housing 11 is larger than another one of the maximum dimensions in the Z direction defined by the SFF-8300, i.e., 42.00 mm. The maximum thickness Dh of the housing 11 is thus about 2 inches. The SFF 8300 defines one of the maximum Z-directional dimensions as 26.10 mm (about 1 inch). Thus, the HDD 10 of the present embodiment has a dimension about twice that of the conventional HDD conforming to the one form factor. Consequently, the HDD 10 of the present embodiment can be accommodated in two slots for two conventional HDDs, and can be replaced with two conventional HDDs. In the case of two conventional HDDs accommodated in two slots, the thicknesses of the bottom walls and covers of their housings and the gap between them limit a storage capacity per occupied space of the HDD. However, the HDD 10 of the present embodiment has only one bottom wall 25 and is free from the above gap. Consequently, the HDD 10 of the present embodiment can provide an increased storage capacity per occupied space.

The HDD 10 can include 20 or more magnetic disks 12. As a result, the HDD 10 can have an increased storage capacity. A conventional HDD typically includes nine magnetic disks 12 or less. In a case that the HDD 10 has a dimension about twice the dimension of the two conventional HDDs in the Z direction, the HDD 10 of the present embodiment can thus provide an increased storage capacity per volume.

The diameter Ds of the shaft 44 is set to 5 mm or more and 10 mm or less. In a conventional HDD the shaft of the spindle motor typically has a diameter of 4 mm or less. Thus, the HDD 10 of the present embodiment includes the shaft 44 of higher rigidity, leading to suppressing the vibration of the rotor 32. Meanwhile, the larger diameter Ds of the shaft 44 means a shortened distance between the shaft 44 and the coil 42. However, in the present embodiment, the bearing 33 and the coil 42 are juxtaposed to each other in the Z direction. Because of this, the HDD 10 can avoid the bearing 33 from interfering with the coil 42.

The dimension Dc of the coil 42 in the Z direction is set to one-third or less of the maximum thickness Dh of the housing 11. In other words, the maximum thickness Dh of the housing 11 is three times or more the dimension Dc of the coil 42. As a result, due to the larger maximum thickness Dh, the housing 11 can accommodate a larger number of the magnetic disks 12. As such, the HDD 10 of the present embodiment can provide an increased storage capacity per volume. In spite of the side-by-side arrangement between the bearing 33 and the coil in the Z direction, the HDD 10 according to the present embodiment can include the rotor 32 of a relatively long length supported by the bearing 33, resulting in suppressing the vibration of the rotor 32.

The plurality of magnetic disks 12 includes the first magnetic disk 71 and the second magnetic disk 72. The second magnetic disk 72 is more apart from the bottom wall 25 than the first magnetic disk 71. The diameter Dd1 of the first magnetic disk 71 is shorter than the diameter Dd2 of the second magnetic disk 72. The side wall 26 has the first shroud 26g extending around the first rotation axis Ax1 and facing the first magnetic disk 71, and the second shroud 26h extending around the first rotation axis Ax1 and facing the second magnetic disk 72. The diameter Di1 of the first shroud 26g is shorter than the diameter Di2 of the second shroud 26h. As a result, in the HDD 10 of the present embodiment, although the first inclined surface 26e is included in the outer surface 25b of the side wall 26, the side wall 26 can be avoided from decreasing in thickness in the vicinity of the bottom wall 25.

Each of the carriages 55 includes the arm 62. The carriages 55 are individually rotatable about the second rotation axis Ax2 extending in the Z direction apart from the first rotation axis Ax1 in a direction orthogonal to the first rotation axis Ax1. That is, the HDD 10 according to the present embodiment includes a so-called multi-actuator. As a result, the HDD 10 can avoid the carriages 55 from increasing in weight, leading to preventing a decrease in angular acceleration of the carriages 55 with respect to a predetermined drive current. Furthermore, in the HDD 10 including the plurality of magnetic disks 12 including the first magnetic disk 71 and the second magnetic disk 72, it is possible to avoid complicating the rotation control of the carriages 55 (actuator assemblies 15). In addition, the inspection time for the HDD 10 can be shortened.

The plurality of arms 62 includes the first arm 75 and the second arm 76. The second arm 76 is more apart from the bottom wall 25 than the first arm 75. In the Z direction the dimension Ta1 of the first arm 75 is larger than the dimension Ta2 of the second arm 76. The plurality of magnetic disks 12 includes the first magnetic disk 71 and the second magnetic disk 72. The second magnetic disk 72 is more apart from the bottom wall 25 than the first magnetic disk 71. In the Z direction the dimension Td1 of the first magnetic disk 71 is larger than the dimension Td2 of the second magnetic disk 72. The plurality of spacers 34 includes the first spacer 77 and the second spacer 78. The second spacer 78 is more apart from the bottom wall 25 than the first spacer 77. In the Z direction the dimension Ts1 of the first spacer 77 is smaller than the dimension Ts2 of the second spacer 78. Positional error of the magnetic disks 12 in the Z direction typically increases as the magnetic disks 12 are further away from the bottom wall 25. In this regard, the HDD 10 according to the present embodiment allows setting of a longer distance between the arms 62 and the magnetic disks 12 at the position apart from the bottom wall 25 by setting the dimensions as above, preventing the arms 62 and the magnetic disks 12 from excessively approaching each other.

The plurality of ramp load mechanisms 17 is aligned with each other in the Z direction apart from the first rotation axis Ax1 and configured to hold the plurality of magnetic heads 14 apart from the magnetic disks 12. Owing to such arrangement, in the HDD 10 of the present embodiment the individual ramp load mechanisms 17 can be avoided from growing in size and lowering in dimensional accuracy.

Second Embodiment

Hereinafter, a second embodiment will be described with reference to FIG. 6. In the following description of the plurality of embodiments, components having functions similar to those of the components already described are denoted by the same reference numerals as those of the components already described, and the description thereof may be omitted. In addition, the plurality of components denoted by the same reference numerals does not necessarily have all the functions and properties in common, and may have different functions and properties according to each embodiment.

Figure 6:
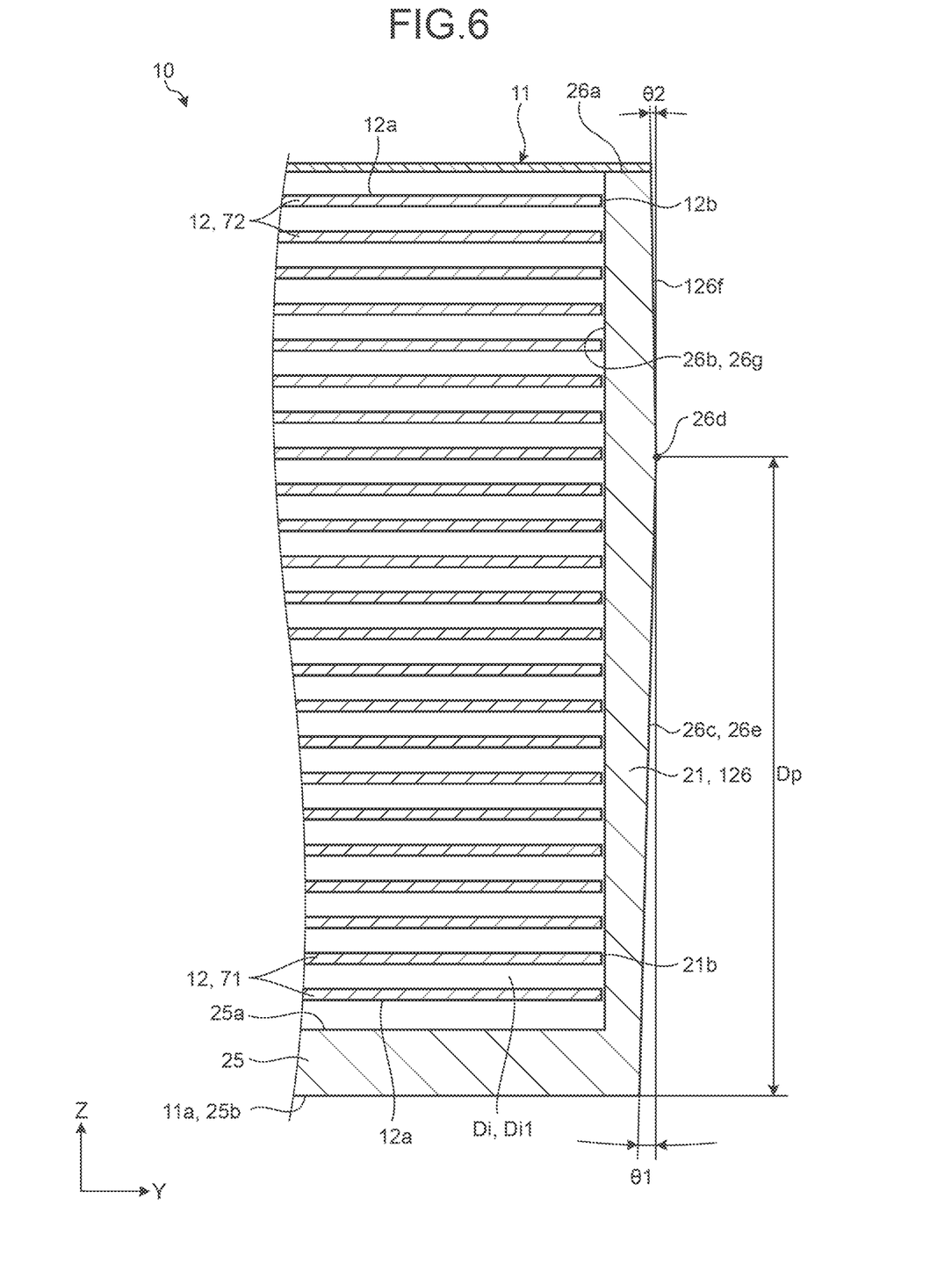
FIG. 6 is an exemplary cross-sectional view schematically illustrating a part of an HDD according to a second embodiment.

FIG. 6 is an exemplary cross-sectional view schematically illustrating a part of an HDD 10 according to the second embodiment. As illustrated in FIG. 6, a base 21 of the second embodiment has a side wall 126 instead of the side wall 26. The side wall 126 is an example of a second wall. The side wall 126 is substantially identical to the side wall 26 of the first embodiment except for the points described below.

The side wall 126 has a second inclined surface 126f instead of the flat surface 26f. The second inclined surface 126f is an example of a second surface and a second inclined surface. A first inclined surface 26e and a second inclined surface 126f are aligned in the Z direction. A parting line 26d is a boundary line between the first inclined surface 26e and the second inclined surface 126f.

The second inclined surface 126f extends between an end surface 26a of a side wall 26 and the parting line 26d. The second inclined surface 126f is inclined with respect to a first rotation axis Ax1 such that the second inclined surface 126f is further away from the first rotation axis Ax1 as is closer to the parting line 26d.

An absolute value of an angle θ1 between the first rotation axis Ax1 and the first inclined surface 26e is larger than an absolute value of an angle θ2 between the first rotation axis Ax1 and the second inclined surface 126f. For the sake of explanation, FIG. 6 illustrates an angle between the Z axis parallel to the first rotation axis Ax1 and the first inclined surface 26e as the angle θ1, and illustrates an angle between the 2 axis and the second inclined surface 126f as the angle θ2.

In the second embodiment, a distance Dp in the Z direction between the parting line 26d and an end 11a of a housing 11 is set to 27 mm or more and 40 mm or less. In other words, the parting line 26d is separated from the end surface 26a of the side wall 26 by 14 mm or more and 27 mm or less in the Z direction.

In the example of FIG. 6, the side wall 126 does not have a second shroud 26h and a step 26i, and the plurality of magnetic disks 12 does not include a second magnetic disk 72. However, the side wall 126 may have the second shroud 26h, and the plurality of magnetic disks 12 may include the second magnetic disk 72.

In the HDD 10 of the second embodiment described above, the side wall 126 includes the first inclined surface 26e, the second inclined surface 126f, and the parting line 26d. The second inclined surface 126f is aligned with the first inclined surface 26e in the Z direction. The parting line 26d is a boundary line between the first inclined surface 26e and the second inclined surface 126f. In the Z direction the distance Dp between the parting line 26d and the end 11a of the housing 11 at the bottom wall 25 is set to 27 mm or more and 40 mm or less. Generally, the first inclined surface 26e extends between the parting line 26d and the end 11a, to facilitate removal of the housing 11 from the mold. Setting the parting line 26d far from the end 11a decreases the thickness of the side wall 126 in the vicinity of the bottom wall 25 due to the first inclined surface 26e. In this regard, in the HDD 10 of the present embodiment, the parting line 26d is set as above, so that the side wall 126 can be avoided from decreasing in thickness in the vicinity of the bottom wall 25.

The side wall 126 has an end surface 26a. The end surface 26a is opposite the end 11a. The first inclined surface 26e extends between the end 11a and the parting line 26d and is exposed to the outside of the housing 11. The second inclined surface 126f extends between the end surface 26a and the parting line 26d and is exposed to the outside of the housing 11. The first inclined surface 26e and the second inclined surface 126f are inclined with respect to the first rotation axis Ax1 such that they are further away from the first rotation axis Ax1 as are closer to the parting line 26d. As a result, the housing 11 becomes easily removable from the mold at the time of manufacturing the housing 11.

The absolute value of the angle θ1 between the first rotation axis Ax1 and the first inclined surface 26e is larger than the absolute value of the angle θ2 between the first rotation axis Ax1 and the second inclined surface 126f. The housing 11 includes a cover 22 fixed to the end surface 26a. Due to the smaller angle θ2 between the first rotation axis Ax1 and the second inclined surface 126f, the end surface 26a can be maintained in a size sufficient to allow the fixation of the cover 22 thereto. Thus, the HDD 10 according to the present embodiment allows the cover 22 and the end surface 26a to be fixed together at sufficient strength.

Third Embodiment

Figure 7:
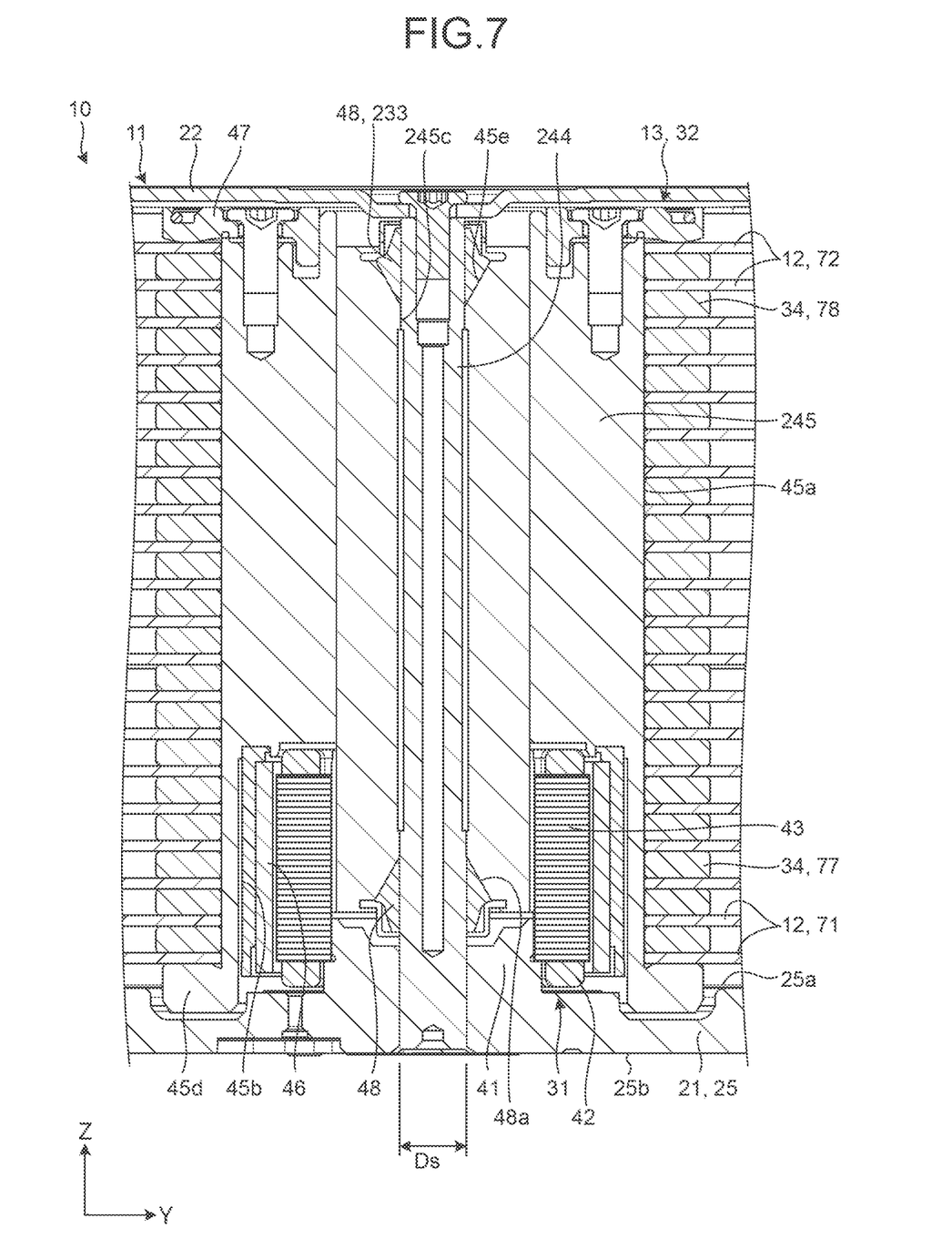
FIG. 7 is an exemplary cross-sectional view illustrating a part of an HDD according to a third embodiment.

Hereinafter, a third embodiment will be described with reference to FIG. 7. FIG. 7 is an exemplary cross-sectional view illustrating a part of an HDD 10 according to the third embodiment. As illustrated in FIG. 7, the HDD 10 according to the third embodiment includes a bearing 233, a shaft 244, and a hub 245 instead of the bearing 33, the shaft 44, and the hub 45. The bearing 233, the shaft 244, and the hub 245 are substantially equal to the bearing 33, the shaft 44, and the hub 45 except as described below.

A diameter Ds of the shaft 244 is shorter than the diameter Ds of the shaft 44 of the first embodiment. Therefore, the shaft 244 is separated from a coil 42. The shaft 244 has rigidity capable of supporting a rotor 32 via the bearing 233.

The hub 245 has a second inner surface 245c instead of the second inner surface 45c. The second inner surface 245c also faces the shaft 244 between the plurality of coils 42 and the shaft 244.

The bearing 233 is located between the shaft 244 and the coil 42 in the radial direction. In other words, the bearing 233 and the coil 42 are aligned in the radial direction. One of the two support members 48 of the bearing 233 is located between the shaft 244 and the coil 42.

In the HDD 10 of the third embodiment described above, the bearing 233 extends between the shaft 244 and the coil 42 in the radial direction. This allows the rotor 32 supported by the bearing 233 to have a relatively long length, leading to suppressing the vibration of the rotor 32.

In the above description, "prevent" and "suppress" are defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive comprising:
a plurality of magnetic disks each of which has a recording surface, the magnetic disks being arranged at intervals in an axial direction intersecting the recording surface;
a spindle motor configured to hold the plurality of magnetic disks and rotate the plurality of magnetic disks about a first rotation axis extending in the axial direction; and
a housing for accommodating the plurality of magnetic disks, the housing including
a first wall to which the spindle motor is attached, and being apart from the plurality of magnetic disks in the axial direction,
an inner surface of the first wall, and facing the recording surface,
an outer surface of the first wall, being opposite the inner surface, and
a second wall protruding from the first wall and surrounding the plurality of magnetic disks in a direction orthogonal to the axial direction, wherein
in the axial direction a maximum distance between the inner surface and the outer surface is 1.5% or more and 8% or less of a maximum thickness of the housing.

2. The hard disk drive according to claim 1, wherein
the plurality of magnetic disks each has a diameter of 80 mm or more and 100 mm or less, and
the maximum thickness of the housing in the axial direction is 26.2 mm or more.

3. The hard disk drive according to claim 2, wherein
the maximum thickness of the housing in the axial direction is more than 42 mm and equal to 54 mm or less.

4. The hard disk drive according to claim 1, wherein
the number of the plurality of magnetic disks is 20 or more.

5. The hard disk drive according to claim 1, wherein
the spindle motor includes
a stator attached to the first wall,
a rotor configured to hold the plurality of magnetic disks and rotate about the first rotation axis with respect to the stator, and
a bearing that rotatably supports the rotor about the first rotation axis,
the stator includes a coil surrounding the first rotation axis,
the stator or the rotor includes a shaft extending along the first rotation axis,
the shaft has a diameter of 5 mm or more and 10 mm or less, and
the bearing and the coil are juxtaposed to each other in the axial direction.

6. The hard disk drive according to claim 5, wherein
in the axial direction the coil has a length of one-third or less of the maximum thickness of the housing.

7. The hard disk drive according to claim 1, wherein
the spindle motor includes a coil surrounding the first rotation axis, and
in the axial direction the coil has a length of one-third or less of the maximum thickness of the housing.

8. The hard disk drive according to claim 1, wherein
the second wall includes a first surface, a second surface aligned with the first surface in the axial direction, and a boundary line between the first surface and the second surface, and
in the axial direction a distance between the boundary line and a first end of the housing is 27 mm or more and 40 mm or less, the first end being on the first wall.

9. The hard disk drive according to claim 8, wherein
the second wall has a second end opposite the first end,
the first surface includes a first inclined surface extending between the first end and the boundary line, the first inclined surface being exposed to an outside of the housing,
the second surface includes a second inclined surface extending between the second end and the boundary line, the second inclined surface being exposed to the outside of the housing, and
the first inclined surface and the second inclined surface are inclined with respect to the first rotation axis such that the first inclined surface and the second inclined surface are further away from the first rotation axis as are closer to the boundary line.

10. The hard disk drive according to claim 9, wherein
an absolute value of an angle between the first rotation axis and the first inclined surface is larger than an absolute value of an angle between the first rotation axis and the second inclined surface, and
the housing includes a cover fixed to the second end.

11. The hard disk drive according to claim 1, wherein
the plurality of magnetic disks includes a first magnetic disk and a second magnetic disk, the second magnetic disk being more apart from the first wall than the first magnetic disk,
the first magnetic disk is shorter in diameter than the second magnetic disk,
the second wall has
a first inner surface extending around the first rotation axis and facing the first magnetic disk, and
a second inner surface extending around the first rotation axis and facing the second magnetic disk, and
the first inner surface is shorter in diameter than the second inner surface.

12. The hard disk drive according to claim 11, wherein
the second wall has a connection surface connecting between an end of the first inner surface and an end of the second inner surface in the axial direction, and facing a direction intersecting with a direction which the first inner surface faces and a direction which the second inner surface faces.

13. The hard disk drive according to claim 1, further comprising:
a plurality of magnetic heads configured to read and write information from and to the plurality of magnetic disks;
a plurality of carriages each of which includes an arm, the carriages extending in the axial direction and being individually rotatable about a second rotation axis, the second rotation axis being apart from the first rotation axis in a direction orthogonal to the first rotation axis; and a plurality of suspensions individually attached to the corresponding arms of the plurality of carriages, to individually hold the corresponding magnetic heads.

14. The hard disk drive according to claim 1, further comprising:

a plurality of magnetic heads configured to read and write information from and to the plurality of magnetic disks;

a carriage including a plurality of arms arranged at intervals in the axial direction, the carriage extending in the axial direction and being rotatable about a second rotation axis, the second rotation axis being apart from the first rotation axis in a direction orthogonal to the first rotation axis;

a plurality of suspensions individually attached to the corresponding arms, to individually hold the corresponding magnetic heads; and a plurality of spacers individually disposed between two adjacent magnetic disks of the plurality of magnetic disks, wherein the plurality of arms includes a first arm and a second arm, the second arm being more apart from the first wall than the first arm, and in the axial direction the first arm is larger in thickness than the second arm.

15. The hard disk drive according to claim 14, wherein the plurality of magnetic disks includes a first magnetic disk and a second magnetic disk, the second magnetic disk being more apart from the first wall than the first magnetic disk, and in the axial direction the first magnetic disk is larger in thickness than the second magnetic disk.

16. The hard disk drive according to claim 14, wherein the plurality of spacers includes a first spacer and a second spacer, the second spacer being more apart from the first wall than the first spacer, and in the axial direction the first spacer is smaller in thickness than the second spacer.

17. The hard disk drive according to claim 1, further comprising:

a plurality of magnetic heads configured to read and write information from and to the plurality of magnetic disks;

a carriage including a plurality of arms arranged at intervals in the axial direction, the carriage extending in the axial direction and being rotatable about a second rotation axis, the second rotation axis being apart from the first rotation axis in a direction orthogonal to the first rotation axis;

a plurality of suspensions individually attached to the corresponding arms, to individually hold the corresponding magnetic heads; and a plurality of spacers individually disposed between two adjacent magnetic disks of the plurality of magnetic disks, wherein the plurality of magnetic disks includes a first magnetic disk and a second magnetic disk, the second magnetic disk being more apart from the first wall than the first magnetic disk, and in the axial direction the first magnetic disk is larger in thickness than the second magnetic disk.

18. The hard disk drive according to claim 1, further comprising:

a plurality of magnetic heads configured to read and write information from and to the plurality of magnetic disks;

a carriage including a plurality of arms arranged at intervals in the axial direction, the carriage extending in the axial direction and being rotatable about a second rotation axis, the second rotation axis being apart from the first rotation axis in a direction orthogonal to the first rotation axis;

a plurality of suspensions individually attached to the corresponding arms, to individually hold the corresponding magnetic heads; and a plurality of spacers individually disposed between two adjacent magnetic disks of the plurality of magnetic disks, wherein the plurality of spacers includes a first spacer and a second spacer, the second spacer being more apart from the first wall than the first spacer, and in the axial direction the first spacer is smaller in thickness than the second spacer.

19. The hard disk drive according to claim 1, further comprising:

a plurality of magnetic heads configured to read and write information from and to the plurality of magnetic disks; and a plurality of ramps located apart from the first rotation axis and configured to hold the plurality of magnetic heads apart from the plurality of magnetic disks, the plurality of ramps being aligned with each other in the axial direction.

* * * * *